H. STULTS.
GARDEN TOOL.
APPLICATION FILED JAN. 26, 1911.
1,008,873.
Patented Nov. 14, 1911.
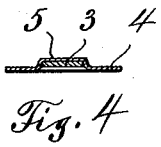
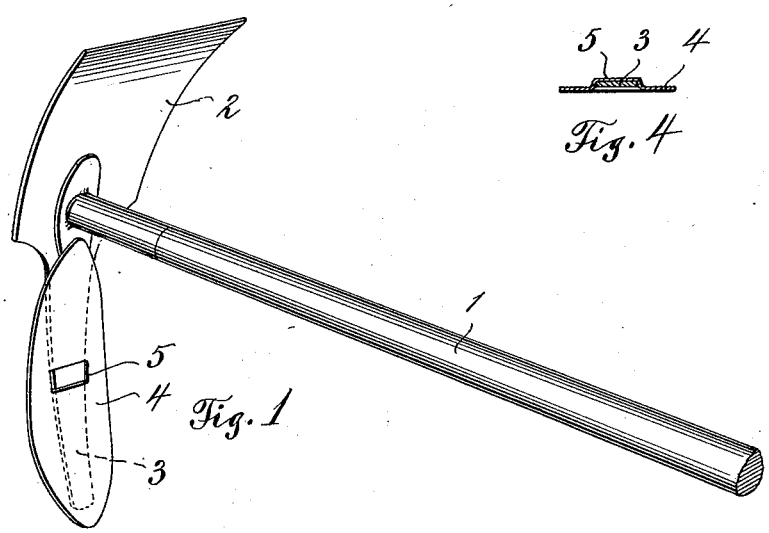
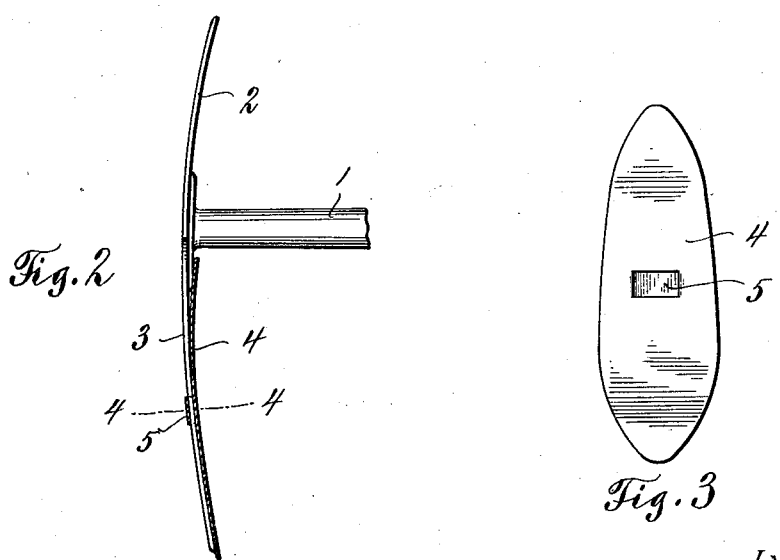
WITNESSES:
INVENTOR
Henry Stults
BY
Attorneys

UNITED STATES PATENT OFFICE.

HENRY STULTS, OF ORONOGO, MISSOURI.

GARDEN-TOOL.

1,008,873.  Specification of Letters Patent.  Patented Nov. 14, 1911.

Application filed January 26, 1911. Serial No. 604,800.

*To all whom it may concern:*

Be it known that I, HENRY STULTS, a citizen of the United States, residing at Oronogo, in the county of Jasper and State of Missouri, have invented certain new and useful Improvements in Garden-Tools, of which the following is a specification.

This invention relates to improvements in garden tools, and particularly to that class of hand implements adapted to be used for cultivating small garden plants, and for excavating or trenching in planting different garden seeds, in combination with the usual hoe implement.

An object of my invention is the provision of an implement which will be cheap in construction as an article of manufacture, and particularly efficient as a combination tool adapted to be quickly transformed from one kind of tool to another without the use of other tools for that purpose.

Another object of my invention is to provide an adjustable auxiliary blade or member adapted to be reversed for the purpose of making different sized trenches in loose soil.

With the above and other objects in view, this invention consists of the construction, combination and arrangement of parts all as hereinafter more fully described, claimed and illustrated in the accompanying drawings, wherein—

Figure 1 is a perspective view showing the invention; Fig. 2 is a side elevation with the auxiliary member in section; Fig. 3 is an elevation of the excavating member showing the attaching means; Fig. 4 is a sectional view on line 4—4 of Fig. 2.

Throughout the following description and on the several figures of the drawings, similar parts are referred to by like reference characters.

Referring more particularly to the drawings, 1 denotes the ordinary handle to which is attached by well-known means a hoe blade of any preferred form. Opposite the hoe blade 2, and integral therewith, is the tapering cultivator finger or blade 3. Adapted to be attached to said cultivator blade 3, by means of the strap or loop 5 punched from its body, is provided an auxiliary excavating member or plate 4 preferably elliptical in shape, one of its rounded ends being of greater width than the other, for purposes hereinafter more fully set forth. In the formation of this tool, it is desirable that the head should be curved, as most clearly shown in Fig. 2.

As will be noted from the drawing, the excavating member 4 is placed on the inner face of the cultivating blade 3 so that the former is afforded a rigid backing or support substantially its entire length, this reinforcement being particularly desirable in devices of this class to prevent likelihood of their displacement, due to wear or strain on the attaching means.

In the use of this implement, it will readily be seen that the same may be used for the ordinary requirements of a hoe, and on the other hand, for the cultivation of small plants, where the ordinary hoe would be of no service. The tapering cultivator blade 3 is designed to be used in cultivating around plants which are in close proximity to each other. When it is desired to make a trench for the purpose of planting small seeds, the auxiliary member 4 is slipped on the tapering blade 3 through the strap or loop 5 far enough to be caused to wedge the member 4 thereon. By drawing this member through the loose soil, the trench will be made; however, it may be desirable for larger seeds to make a larger width trench, in which case the excavating member is reversed and positioned on the tapering blade in the manner previously described.

As an article of manufacture, the excavating member may be very economically made by stamping same from sheet metal, the strap or loop being readily punched therefrom in the same operation.

Having thus fully described my invention, what is claimed as new is:—

1. In a garden tool comprising a handle, a cultivator blade attached thereto, and a reversible auxiliary excavating member having means for reversibly securing said member on the cultivator blade so that the body of the excavating member is in contact with the blade substantially the entire length thereof and reinforced thereby.

2. A garden tool comprising a handle, a cultivating blade attached thereto, and a reversible auxiliary excavating member comprising a plate having the oppositely disposed ends thereof of different widths and means intermediate said ends consisting of a strap or loop punched from the body thereof for removably securing said member on said cultivating blade.

In testimony whereof I affix my signature in presence of two witnesses.

HENRY STULTS.

Witnesses:
H. C. LISCH,
L. R. ARNOLD.

Copies of this patent may be obtained for five cents each, by addressing the "Commissioner of Patents, Washington, D. C."